(No Model.)
E. BOENING.
BEER MEASURING FAUCET.
No. 603,984. Patented May 10, 1898.
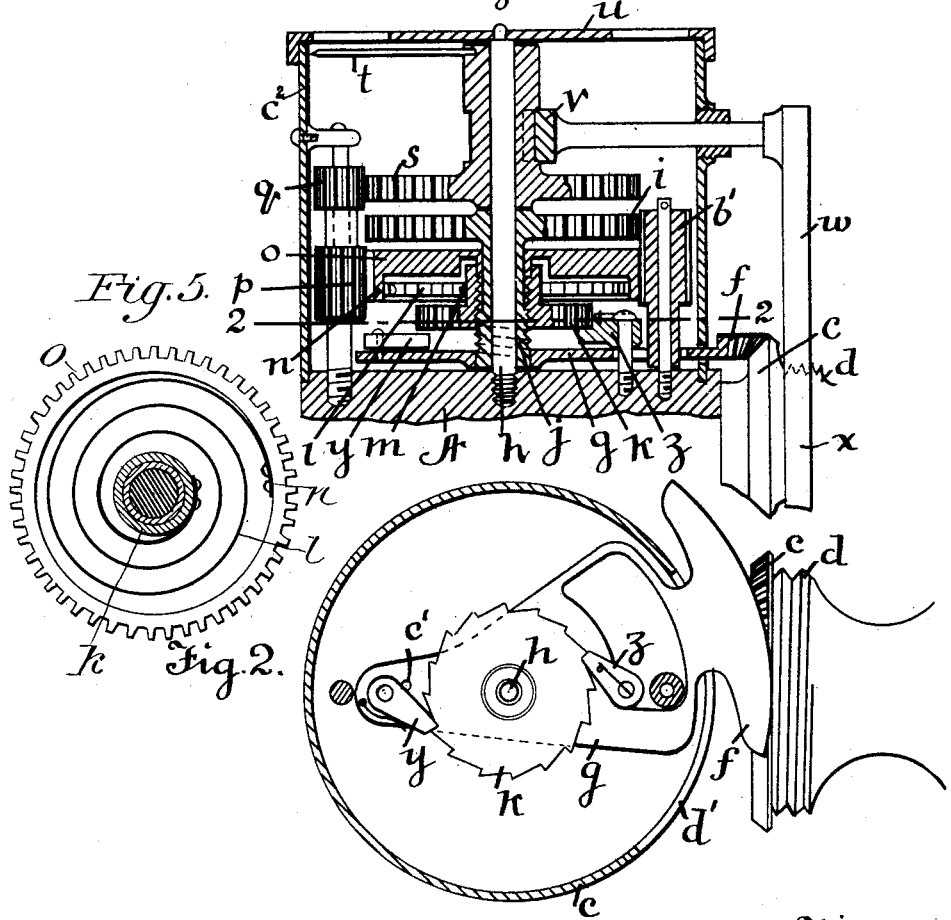
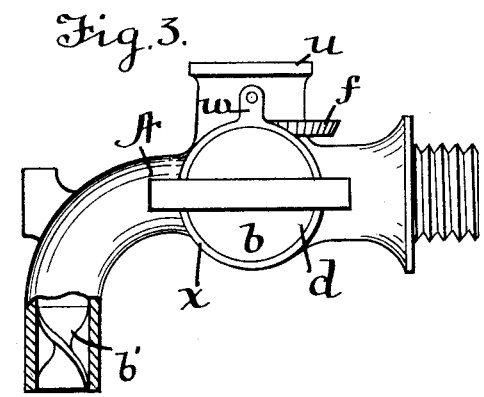
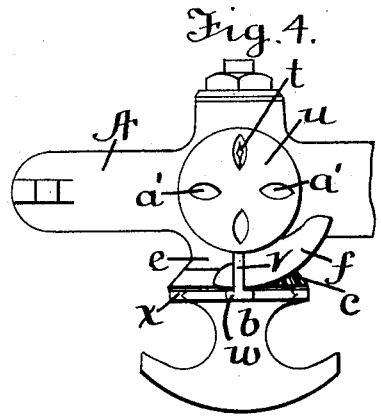
Witnesses.
A. Tisell.
D. J. Morgan
Inventor.
Ernest Boening
by A. P. Thayer.
Atty.

UNITED STATES PATENT OFFICE.

ERNEST BOENING, OF YONKERS, NEW YORK, ASSIGNOR OF THREE-FOURTHS TO WILLIAM D. BALDWIN, OF SAME PLACE, AND JAMES H. WALLING, OF BROOKLYN, NEW YORK.

BEER-MEASURING FAUCET.

SPECIFICATION forming part of Letters Patent No. 603,984, dated May 10, 1898.

Application filed March 3, 1897. Serial No. 625,839. (No model.)

*To all whom it may concern:*

Be it known that I, ERNEST BOENING, a citizen of the United States, residing at Yonkers, in the county of Westchester and State of New York, have invented certain new and useful Improvements in Beer-Measuring Faucets; and I do hereby declare the following to be a full, clear, and exact description of the invention, such as will enable others skilled in the art to which it appertains to make and use the same.

My invention consists of apparatus contrived to indicate the quantity of beer and such other fluids as may not be accurately measured in the receptacle on account of foaming by the movement of an indicator-hand set in motion automatically when the faucet is opened through a certain distance around a dial graduated according to the flow of the liquid through the faucet, as hereinafter described, reference being made to the accompanying drawings, in which—

Figure 1 is a sectional elevation of the indicating apparatus to be applied to a faucet. Fig. 2 is a horizontal section on line 2 2, Fig. 1. Fig. 3 is a side elevation of a faucet provided with my indicator apparatus with a part in section. Fig. 4 is a plan view. Fig. 5 is a plan view of the hub of the ratchet-wheel, coiled spring connected to said hub to be tensioned, and a horizontal section of the master-wheel to be actuated by said spring.

A represents the faucet-tube, and $b$ the plug-valve, which may be of any ordinary construction except that I apply a bevel-toothed segment $c$ and a screw-threaded collar $d$ to the plug in close proximity to the mouth of the socket $e$ in the faucet-tube for the plug. The toothed segment $c$ gears with a corresponding toothed segment $f$ on the extremity of a pawl-lever $g$, lying horizontally on the top of the faucet-tube and pivoted on a center stud $h$, set upright on said tube and extending upward to a suitable height for the various other devices also centered on it, as shown, one of which is the spur-wheel $i$, which has a sleeve $j$ on its under side resting on the valve-tube, or it may be on the paw-lever $g$ and supporting said wheel a suitable distance above the pawl-lever.

The sleeve $j$ is screw-threaded for a short distance from its lower end upward, and the ratchet-wheel $k$ is fitted thereto for being turned on the sleeve to wind up a coiled spring $l$, one end of which is attached to its hub at $m$, the other end of the spring being attached at $n$ to a master-wheel $o$, which also turns on the sleeve $j$, but on the unthreaded portion above the part that is threaded in the ratchet-wheel, and on which it is free to rise and fall, it being supported on the top of the hub of the ratchet-wheel. This wheel $o$ gears with a pinion $p$, which turns another pinion $q$, which turns another spur-wheel $s$, centered on stud $h$ and carrying a pointer $t$ under a graduated dial $u$. A brake $v$ is applied to the hub of wheel $s$, the staff of which is connected to the arm $w$ of a ring-hub $x$, threaded on the screw-threaded collar $d$ of the plug $b$.

In Fig. 1 the ratchet-wheel $k$ is represented as screwed up on sleeve $j$ out of engagement with the pawl $y$, carried on pawl-lever $g$ for actuating said ratchet-wheel to wind up the spring $l$, which is the motor for moving the pointer $t$. How and why the ratchet-wheel $h$ is so shifted up will be explained farther on. For the present it is to be understood that the ratchet-wheel is normally down in engagement with the operating-pawl $y$ and that it is always in engagement with the retaining-pawl $z$.

It will be noted that the threads $d$ are left-handed and that the pawl-lever $g$ is in the right extremity of its range when the valve is closed, and the brake $v$ is in contact with the hub of the pointer-carrying wheel $s$, holding the pointer at rest by overcoming the tendency of the spring to turn it.

The valve is to be turned to the left for opening to draw the liquid. This relaxes the pressure of the brake on the wheel-hub and allows the spring to set the pointer in motion at the moment the valve opens. At the same time the pawl $y$ is shifted back along the ratchet-wheel preparatory to winding the spring and restoring its expended energy when the valve is turned back again to the right hand for closing it.

To begin with, the tension of the spring is to be so adjusted that the pointer $t$ will move from one to the other of the points $a'$ of the dial-scale while a given quantity of liquid flows through the valve—say one pint—the atmospheric pressure in the barrel being uniform, as is the case in beer-drawing apparatus generally, where there is commonly an air-pump attached for controlling the pressure.

As the valve is opened to the same extent at all times, whether the quantity to be drawn is one or more pints, there will always be the maximum extent of the winding of the spring, while the unwinding will be more or less limited. Provision has been made to prevent excessive winding. It is for this purpose that the ratchet-wheel $k$ is made to rise on the screw-threaded sleeve $j$ out of engagement with the actuating-pawl $y$, so that while the spring is under excessive tension winding will be discontinued when the valve opens, and to return the ratchet-wheel into engagement with the pawl again as the spring relaxes the sleeve $j$ is attached to the spur-wheel $i$, which is geared with the master-wheel $o$ by the long pinion $b'$, so that when the master-wheel is in action for actuating the pointer the sleeve turns in the direction (left hand) to screw the ratchet-wheel down again. A stop $c'$ retains pawl $y$ in the proper relation to the ratchet-wheel $k$ to permit reengagement of the pawl, which will always register with one of the notches of the ratchet-wheel, owing to prearrangement of the retaining-pawl suitably therefor.

It will be seen that when properly adjusted for tension in the first place the spring will thereafter be automatically maintained as adjusted.

It is to be understood that any kind of regulator, as a fan or the like, may be employed in practice to regulate the operation of the spring while in motion.

A suitable case $c^2$ for inclosing an apparatus is attached or formed on the upper side of the faucet-tube in any approved way, one side of which is slotted, as at $d'$, for the pawl-lever.

In the discharge-nozzle of the faucet I provide a spiral partition $b'$ for imparting spiral motion to the stream of liquid escaping from the faucet, and thereby in the case of beer rendering it more lively. It may be otherwise constructed; but I prefer the spiral form. Such an attachment is feasible in a measuring-faucet where the quantity is determined in advance and in no way affected by the foaming effected by said attachment.

I am aware that a rotating screw-propeller has been arranged in the discharge-nozzle of a faucet for being turned by the liquid as a motor for actuating a registering device; but such a device is the reverse of what I claim, the screw being turned by the liquid, which flows about as smoothly as without the screw, while in my case it is the liquid that is turned by the screw and is thereby enlivened. My device is a fixed partition of the discharge-passage.

I claim—

1. The combination with a faucet of an automatic spring-power-actuated indicator, valve-actuated spring-winder, and valve-actuated controlling-brake for the spring substantially as described.

2. The combination with a faucet of an automatic spring-power-actuated indicator, valve-actuated spring-winder, automatic spring-power-actuated tension-regulator for the spring, and valve-actuated controlling-brake for the spring substantially as described.

3. The combination with a faucet, of an automatic spring-power-actuated indicator, automatic spring-winding apparatus geared with the valve for being actuated thereby, and a spring-power-controlling brake also geared with the valve for release when the valve opens and for application when the valve closes substantially as described.

4. The combination with a faucet, of an automatic spring-power-actuated indicator ratchet-wheel for winding up the spring-pawl, pawl-lever for actuating the ratchet-wheel, and gears connecting the pawl-lever with the valve for actuating it thereby substantially as described.

5. The combination with a faucet, of an automatic spring-power-actuated indicator, ratchet mechanism geared with the valve for winding up the spring, means for disconnecting the actuating-pawl from the ratchet-wheel to limit overtension of the spring, and means for restoring the connection when the tension of the spring relaxes substantially as described.

6. The combination with a faucet, of an automatic spring-power-actuated indicator, ratchet mechanism geared with the valve for winding up the spring, whereof the ratchet-wheel is mounted on a screw-threaded pivot center for release from the pawl to limit overtension, and said pivot center is geared with the master-wheel of the spring-power for relaxing overtension of the spring substantially as described.

In testimony whereof I affix my signature in presence of two witnesses.

ERNEST BOENING.

Witnesses:
W. J. MORGAN,
A. P. THAYER.